Aug. 8, 1944.  C. J. FREY  2,355,370
ENGINE MOUNT
Filed Feb. 27, 1942  2 Sheets-Sheet 1
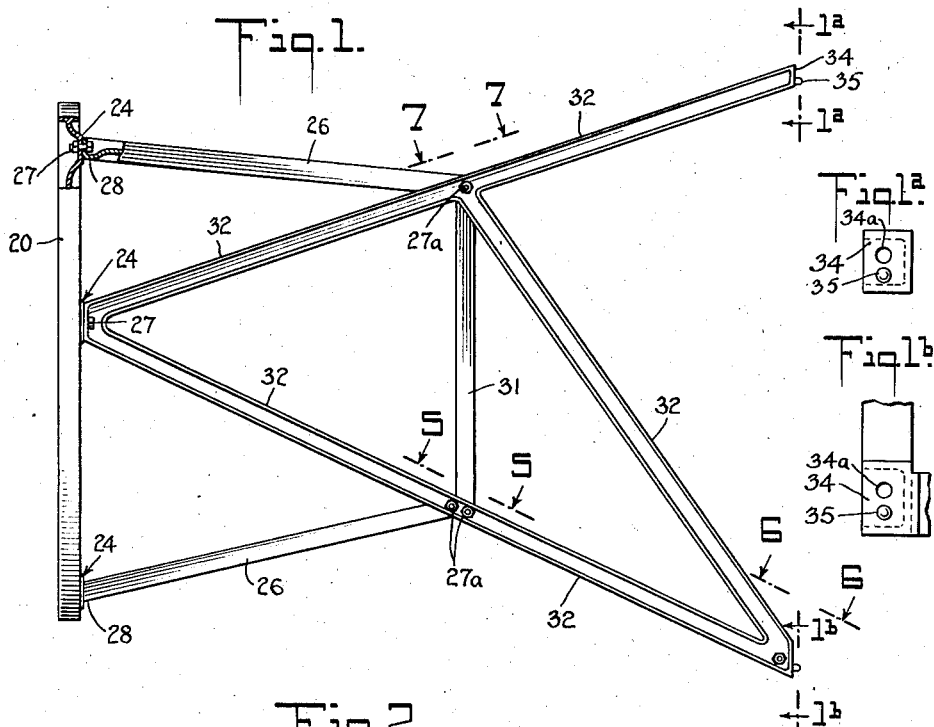
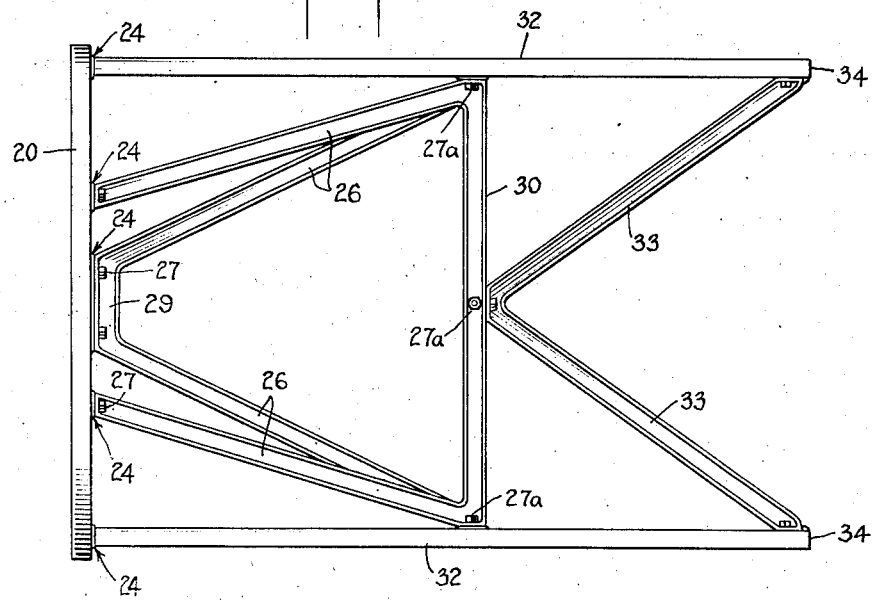
INVENTOR
Christopher J. Frey
HIS ATTORNEY

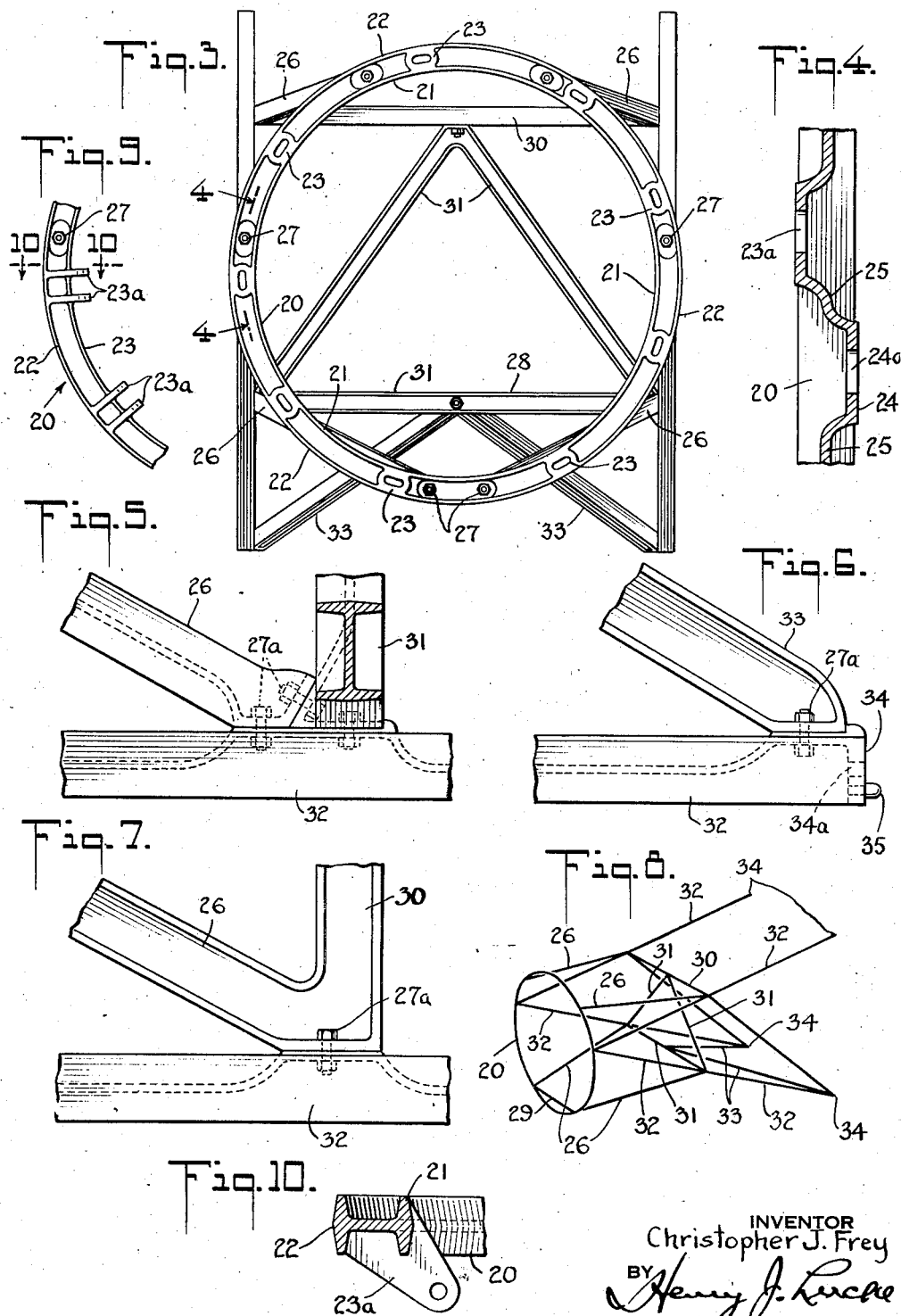

Patented Aug. 8, 1944

2,355,370

UNITED STATES PATENT OFFICE 2,355,370

ENGINE MOUNT

Christopher J. Frey, Forest Hills, N. Y.

Application February 27, 1942, Serial No. 432,657

5 Claims. (Cl. 248—5)

The invention relates to engine mounts.

More particularly, the invention relates to mounts for airplane engines.

Heretofore, mounts for airplane engines have been formed of sections of tubing, usually of chrome-molybdenum-steel, the tubular sections being secured to one another by welding to form the desired configuration and supporting and bracing struts. Such welded tubular mount assembly requires also attachment fittings, usually of forged steel, for securement of the engine and other appurtenant parts to the mount and the securement of the mount and its thereto attached parts to the fuselage or equivalent, such attachment pieces being affixed to the tubular parts of the mount by welding.

Such assembly of present day engine mounts has proven to be a serious "bottleneck" in actual production of completed airplanes and for many reasons, principally in that the ends of the tubular parts require accurate fitting as an initial factor of satisfactory welding and necessitating the employment of welders of high degree of skill and experience, of which under normal conditions the available number is scarce and under our present intensive war effort are critically limited in number.

Furthermore, notwithstanding that the average tensile strength of crome-molybdenum-steel is of the order of 90,000 pounds per square inch, the numerous welding operations and normalizing to relieve cracking strains materially reduce the resultant effective tensile strength.

Pursuant to the present invention, the mount is formed of metal, preferably aircraft X4340 S. A. E., chrome-molybdenum-steel, which may be of rough rolled stock and the mount parts thereof formed by die forging and then heat-treated to provide an average tensile strength of the order of 180,000 pounds and upward per square inch. The component die forged parts are assembled by mating attachment faces forged integrally with the respective mount parts and the assembly completed by bolts or equivalent; AN specification bolts with castellated nuts and cadmium plated washers are preferred. Such attachment faces require for precision finish mere milling or grinding and the bolt holes jig drilled and reamed.

Advantages of the invention, inter alia, are: employment of rough forging stock in lieu of finished tubing, effecting reduction to appreciatedly one-third in material costs; die forging, expediting manufacture and affording simplicity in standardization; with adequate tooling enabling employment of semi-skilled operators in lieu of highly skilled welders; production of detail components at desired different locations under central tooling control; affording shipment of mount parts disassembled to receiving points where the mount parts may be readily assembled and predetermined assembly assured; interchangeability of complete assembly, and assurance that each and every detail component may be replaced, by reason of controlled accurate tooling; in the event of damage of any detail component, replacement of complete engine mount is obviated, since such damaged detail component is readily and accurately replaced by precise duplicate.

Further features and objects of the invention will be more fully understood from the following detail description and the accompanying drawings, in which:

Fig. 1 is a side elevation of a typical configuration of mount assembly for an airplane engine, embodying a preferred form of the invention.

Fig. 1a is a detail view on line 1a—1a of Fig. 1.

Fig. 1b is a detail view on line 1b—1b of Fig. 1.

Fig. 2 is a top plan view of Fig. 1.

Fig. 3 is a front elevational view of Fig. 1.

Fig. 4 is a sectional elevation on line 4—4 of Fig. 3, on an enlarged scale.

Fig. 5 is a detail elevational view on line 5—5 of Fig. 1, on an enlarged scale.

Fig. 6 is a detail elevational view on line 6—6 of Fig. 1, on an enlarged scale.

Fig. 7 is a detail elevational view on line 7—7 of Fig. 1, on an enlarged scale.

Fig. 8 is a schematic view illustrating in perspective the component parts of the typical mount illustrated in the foregoing figures.

Fig. 9 is a detail rear view of a portion of another preferred construction of the ring part.

Fig. 10 is a detail sectional view, on an enlarged scale, taken on line 10—10 of Fig. 9.

Carrying out a typical configuration of an airplane engine mount illustrated diagrammatically in Fig. 8 of the drawings, the invention provides the ring part 20, see Figs. 1, 2, 3 and 4, which is usually attached to the engine, either to its transmission case or other suitable part of the engine per se, attachment pieces being provided for the purpose. Such ring part 20 is formed of the stated preferred material by die forging of rough rolled stock. Preferably inner and outer circular or peripheral flanges 21, 22 are forged integral with the web body of the ring; it is advantageous to form such flanges 21, 22 at the opposing edges of the ring body. Also forged integrally with the ring part on one face thereof are attachment face portions 23, 23, etc. of such number and relative location conforming to the number and relative location of the attachment pieces carried by the engine.

Attachment faces 24, 24, etc. are also provided at another face, usually the opposite face of the ring part 20, which are also die forged integrally with the ring body 20. Such attachment faces 23, 24 are preferably formed by merging the web, see 25, 25, Fig. 4, with the edges of the respective flanges of the ring body 20 with attendant mechanical advantages.

These attachment faces 23, 24 require mere milling or grinding for accuracy.

The securement of the airplane engine to the ring part 20 through the intermediation of the attachment faces 23 is had by bolts or equivalent. For such bolt securement the attachment faces are provided with sets of ears 23a having bolt-receiving openings, preferably closed ended slots, to accommodate a range of adjustment of connection with engine attachment fittings.

Carrying out a typical configurated airplane engine mount, see schematic Fig. 8, supporting and bracing struts rearwardly, forwardly and intermediate, or equivalent, are assembled in the desired association with the ring part 20, each such strut or equivalent being preferably formed of like material and by like procedure.

Thus, the supporting leg parts 26, 26, etc. are respectively assembled with respect to the ring part 20 by bolts 27a or equivalent which are passed through the openings 24a of the attachment faces 24 of the ring 20 and registering openings of the attachment faces 28 of the leg parts 26, 26 etc. If desired, and as shown, a cross leg part 29 or elongated attachment may be forged integrally with the end portions of two leg parts 26, 26, shown lowerly connected to the ring part 20. Similarly, two upwardly disposed leg parts 26, 26, may be integrally forged at their rear ends to the transverse longer leg part 30.

Such leg parts individually are preferably forged of web formations with longitudinally extending end flanges, generally similar to the formation of the ring part 20. Also such leg parts are forged integrally with attachment faces for securement therewith of the desired associated mount parts.

Typical of such associated mount parts, as shown graphically in Fig. 8 and in detail in Figs. 1 through 7, the triangularly configurated supporting and bracing part is integrally forged preferably of web formation and edge flanges, similarly as the foregoing parts 20, 26, and also preferably with integrally forged attachment faces for securement by means of bolts 27a or equivalent with similar or other attachment faces of the upper and lower legs 26, 26, etc. and remaining parts of the supporting and bracing structure.

As appears in diagrammatic Fig. 8, in assembly in Fig. 3, and in detail in Fig. 7, 31 designates triangularly arranged supporting and bracing parts, each integrally forged preferably of web formation and edge flanges, similarly as the foregoing parts, interconnecting and bracing the stated leg parts 26, 26, the leg part 30, and their therewith connected supporting and bracing parts.

Also, pursuant to the typical engine mount, further shown diagrammatically in Fig. 8 and in detail in Figs. 3 and 4, are diagonally extending mount parts 32, 32, etc. similarly integrally forged and preferably of web formation with end flanges and therewith integrally forged attachment faces for securement respectively to the attachment faces 24 of the ring part 20, to the abutting ends of the leg parts 26, 26, etc.

The attachment faces 34 at the free ends of the diagonal mount parts 32, 32 are dimensioned to lie in a common plane. Preferably, such attachment faces 34 are provided with pilot lugs 35, for facilitating the stage of bolting of the attachment faces 34, 34, etc. to the fire wall or other fixed structure of the airplane, for which purpose the attachment faces 34 are provided with bolt holes 34a for the passing of bolts such as the bolts 27a, etc.

From the above, it is apparent that the invention provides generally for an engine mount including a ring or equivalent die forged integrally of material of high mechanical strength and with assured accuracy by the employment of master control tooling, the remaining supporting and bracing parts of the mount being similarly die forged integrally with respect to all of their parts, and the assembly completed by simple mechanical elements such as bolts, the inventive concept affording the advantages set out hereinabove and other advantages apparent to those skilled in the art.

Whereas I have described my invention by reference to specific form thereof, it will be understood that many changes and modifications may be made without departing from the spirit of the invention.

I claim:

1. A supporting frame for airplane engines comprising a pair of spaced longérons, each longéron being bent to an angle forward, with the legs extending rearwardly, a circular engine mount, vertically spaced transverse members connecting corresponding legs of said longéron intermediate their ends, substantially parallel longitudinal members in approximately rectangular array connecting said circular engine mount to the junctures of said longéron legs and said transverse member, inclined truss members extending each from the lower two of said junctures to a point of the upper transverse member intermediate its ends, downwardly and rearwardly extending members connecting the upper two junctures of the longitudinal members with the upper longéron legs to the rearward ends of the lower longéron legs, and a pair of bracing members extending each respectively from a common point intermediate the ends of the lower transverse members to the rear ends of the lower legs of the longérons.

2. A supporting frame for airplane engines comprising a pair of spaced longérons, each longéron being bent to an angle forward, with the legs extending rearwardly, a circular engine mount, a pair of vertically spaced approximately U-shaped members connected to said circular engine mount and to the upper and lower legs of said longérons respectively at points intermediate their ends, an angular truss member having the ends of its legs connected to the juncture of the lower U-shaped member with the lower longéron legs and its apex connected to a point intermediate the ends of the transverse portion of the upper U-shaped member, an angular brace member having its apex connected to a transverse connecting the intermediate juncture at the lower legs of the longéron and the ends of said brace member connected to the ends of the lower legs of the longéron.

3. A structure in accordance with claim 1, in which the engine mount and frame members are of channelled form and provided at their junction points with attachment faces.

4. A structure in accordance with claim 2, in which the engine mount and frame members are of channelled form.

5. A structure in accordance with claim 2, in which the engine mount and frame members are of channelled form and provided at their junction points with attachment faces.

CHRISTOPHER J. FREY.